(12) United States Patent
Heim et al.

(10) Patent No.: US 6,669,916 B2
(45) Date of Patent: Dec. 30, 2003

(54) METHOD AND APPARATUS FOR PURIFYING CARBON DIOXIDE FEED STREAMS

(75) Inventors: Carl Joseph Heim, Amherst, NY (US); Amitabh Gupta, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 27 days.

(21) Appl. No.: 09/780,539

(22) Filed: Feb. 12, 2001

(65) Prior Publication Data

US 2002/0150522 A1 Oct. 17, 2002

(51) Int. Cl.[7] .................. B01D 53/72; B01D 53/02; B01D 53/04; C01B 31/20
(52) U.S. Cl. ................. 423/245.1; 423/437.1; 95/143; 95/146; 95/147
(58) Field of Search .................. 423/220, 224, 423/230, 437.1, 245.1, 245.3; 95/141–147

(56) References Cited

U.S. PATENT DOCUMENTS

| | | | | |
|---|---|---|---|---|
| 3,443,886 | A | * 5/1969 | Taylor et al. | 252/192 |
| 3,657,892 | A | * 4/1972 | Perga et al. | 422/171 |
| 4,460,395 | A | * 7/1984 | Nobles et al. | 62/625 |
| 5,059,405 | A | * 10/1991 | Watson et al. | 423/210 |
| 5,061,464 | A | 10/1991 | Cordonna, Jr. et al. | 423/213.5 |
| 5,145,825 | A | 9/1992 | Deeba et al. | 502/242 |
| 5,262,131 | A | * 11/1993 | Bayer et al. | 422/171 |
| 5,284,638 | A | * 2/1994 | Hertl et al. | 423/245.1 |
| 5,658,541 | A | 8/1997 | Matros et al. | 423/210 |
| 5,743,929 | A | * 4/1998 | Kapoor et al. | 65/134.6 |
| 6,051,199 | A | * 4/2000 | Teller | 423/245.1 |
| 6,224,843 | B1 | * 5/2001 | Ahmed et al. | 423/240 R |
| 2002/0020293 | A1 | * 2/2002 | de Poitiers et al. | 95/149 |
| 2002/0036086 | A1 | * 3/2002 | Minkkinen et al. | 166/266 |

FOREIGN PATENT DOCUMENTS

JP  10130009 A  * 5/1998  ........... C01B/31/20

OTHER PUBLICATIONS

Kohl, A.L. et al., "Gas Purification", Fifth Edition, pp. 1087 and 1094, Gulf Publishing Co. (1997).

* cited by examiner

Primary Examiner—Steven Bos
Assistant Examiner—Anthony Kuhar
(74) Attorney, Agent, or Firm—Donald T. Black

(57) ABSTRACT

Disclosed are a carbon dioxide purification process and apparatus including (i) an adsorbing step for removing a predetermined amount of hydrocarbons from a carbon dioxide feed gas to reduce the caloric value of the feed stream, and (ii) a catalytic oxidation step located downstream of the adsorbing step for removing residual hydrocarbons from the feed gas by catalytic oxidation.

8 Claims, 3 Drawing Sheets

METHOD AND APPARATUS FOR PURIFYING CARBON DIOXIDE FEED STREAMS

BACKGROUND OF THE INVENTION

1. Field of the Invention

This invention generally relates to a method and apparatus for recovering carbon dioxide from a feed stream and reducing the costs of carbon dioxide purification systems. More particularly, the invention relates to a carbon dioxide purification method and apparatus utilizing an adsorbent bed, such as activated carbon, in combination with a catalytic oxidation system.

2. Description of the Related Art

Table 1 lists the concentrations of various components of a carbon dioxide feed stream from, for example, a well or an exhaust stream from a chemical process.

TABLE 1

FEED GAS COMPOSITION

| Constituent | Conc. Ppm (v) | Lbs./hr.[1] | Btu's/hr. (from combustion) | $O_2$ Required For Oxidation Lbs./hr. |
|---|---|---|---|---|
| Nitrogen | 130 | NA | NA | NA |
| Methane[2] | 7,730 | 27.13 | 569,730 | 108.5 |
| Ethane | 1,230 | 8.10 | 165,261 | 17.2 |
| Propane | 940 | 9.07 | 178,361 | 23.1 |
| Iso-butane | 260 | 3.31 | 64,922 | 11.9 |
| N-butane | 360 | 9.57 | 89,636 | 16.4 |
| Iso-pentane | 150 | 2.37 | 46,213 | 8.4 |
| N-pentane | 180 | 2.84 | 44,378 | 10.1 |
| Hexane | 380 | 7.17 | 139,034 | 25.4 |
| Cyclohexane | 290 | 5.34 | 100,638 | 18.3 |
| Benzene | 4,800 | 82.12 | 1,432,621 | 252.7 |
| Toluene | 1,000 | 20.18 | 355,188 | 63.2 |
| Carbon Dioxide | Remainder | | NA | NA |
| TOTAL Combustibles | | 177.2 | 3,185,982 | 555.2 |

[1]Based on a 100 metric ton per day facility
[2]Only partially removed by catalytic oxidation due to choice of catalyst and operating conditions.

As shown, the feed stream contains various hydrocarbons that must be removed to provide relatively pure carbon dioxide. Currently, technologies such as scrubbers, adsorption systems and catalytic oxidation systems are employed to remove the hydrocarbons from the gas stream. These technologies are briefly discussed below.

Scrubbers generally utilize a water wash and are sufficient for removing water soluble hydrocarbons such as, for example, ethanol and methanol from feed streams. However, scrubbers are not effective for removing hydrocarbons that are not water soluble. Instead, adsorption beds and catalytic oxidation systems are generally used to remove non-water soluble hydrocarbons.

A typical adsorption bed includes activated carbon as an adsorbing medium. Such an adsorption bed is generally effective for inexpensively removing large quantities of hydrocarbons having boiling points greater than 20° C. However, activated carbon beds are relatively inefficient in terms of capital and operating costs when the subject feed stream contains both weakly and strongly adsorbing species. (Basmadjian, p.75) For example, the weakly adsorbing species are typically displaced by the strongly adsorbing species and, consequently, not all hydrocarbon species are effectively adsorbed. Additionally, compounds such as ethane, propane, butane, methyl ether, etc., are not removed to the levels required (low ppm and/or ppb) for food grade carbon dioxide. For at least the foregoing reasons, an activated carbon system alone removes the contaminants only partially, for example only about 70% by weight of the hydrocarbon impurities in a feed stream described in Table 1 will be effectively removed by adsorption and therefore will not meet the specification of food grade carbon dioxide. (Table 5)

In addition to scrubbers and adsorption beds, catalytic oxidation systems may also be used to remove hydrocarbons from the feed stream. Catalytic oxidation systems are used for destroying volatile organic hydrocarbons and odorous compounds in exhaust air streams. Typically, for a feed stream containing ethane, propane and butane, catalytic oxidation over a platinum or palladium catalyst alone is effective even if water soluble and/or high boiling point hydrocarbon components are present. Since the feed gas may not contain adequate oxygen, oxygen must often be added to the feed stream to assure complete combustion of the hydrocarbons, and the amount and cost of the oxygen increases as the hydrocarbon level in the feed stream increases.

A significant amount of heat is generated when combusting high levels of hydrocarbons, and the heat must be removed to protect the catalyst and vessels. To limit heat generation, combustion is performed in multiple combustion stages. Heat generation in each stage may be controlled by limiting the amount of oxygen fed to each combustion stage, and by recycling carbon dioxide to reduce the concentration of hydrocarbons entering each combustion stage. Features such as multiple combustion stages, and oxygen limiting and heat removing systems, increase the complexity and costs associated with prior art catalytic oxidation systems.

By way of example, FIG. 1 illustrates a block flow diagram of a conventional three stage catalytic oxidation system for purifying the previously described feed stream. Table 2 contains an example of typical characteristics as the feed stream is being processed by the catalytic oxidation system depicted in FIG. 1.

TABLE 2

TYPICAL STREAM CHARACTERISTICS OF A FEED GAS

| Stream No. | Press. Psig | Temp. ° F. | Flow SCFH | Lbs. of Hydrocarbon | Caloric Value (Btus/ Standard Cubic Foot |
|---|---|---|---|---|---|
| 1 | 300 | 100 | 80,208 | 177.20 | 39.72 |
| 2 | 298 | 500 | 82,123 | 177.20 | 38.80 |
| 3 | 297 | 875 | 82,273 | 121.93 | 27.00 |
| 4 | 297 | 875 | 46,722 | 69.24 | 27.00 |
| 5 | 294 | 200 | 46,722 | 69.24 | 27.00 |
| 6 | 297 | 875 | 35,551 | 52.69 | 27.00 |
| 7 | 294 | 489 | 82,273 | 121.93 | 27.00 |
| 8 | 291 | 500 | 84,193 | 121.93 | 26.39 |
| 9 | 290 | 875 | 84,595 | 70.66 | 12.41 |
| 10 | 290 | 875 | 3,166 | 2.64 | 12.41 |
| 11 | 289 | 589 | 3,166 | 2.64 | 12.41 |
| 12 | 290 | 875 | 81,429 | 68.01 | 12.41 |
| 13 | 289 | 865 | 84,595 | 70.66 | 12.41 |
| 14 | 286 | 530 | 86,293 | 70.66 | 12.17 |
| 15 | 285 | 875 | 86,968 | 27.13 | 6.55 |
| 16 | 282 | 115 | 86,968 | 27.13 | 6.55 |
| 17 | 325 | 70 | 1,915 | 0 | 0 |
| 18 | 325 | 70 | 1,920 | 0 | 0 |
| 19 | 325 | 70 | 1,698 | 0 | 0 |

Referring to FIG. 1, oxygen from a first oxygen source 30 (stream 17) is injected into a feed gas 10 stream 1) entering catalytic oxidation system 5 prior to the feed gas 10 entering a first heat exchanger 20. This oxygen provides an oxidant source for subsequent combustion of the feed gas 10 in a first reactor 40. The feed gas 10 is warmed in heat exchanger 20 as will be discussed below, enters the first reactor 40 (stream 2) and undergoes a catalytic oxidation process. The temperature of feed gas 10 in the first reactor 40 is measured by a first thermometer 50 and the amount of oxygen injected into the feed gas 10 by the first oxygen source 30 is controlled in accordance with the measured temperature. The temperature of the first reactor 40 is controlled to be about 875° F. to ensure favorable reaction kinetics for combusting the hydrocarbons in the feed gas 10.

Feed gas 10 (stream 2) entering the first reactor 40 is brought up to the necessary activation temperature, about 500° F., by passing through first heat exchanger 20. The first heat exchanger 20 uses a portion (stream 4) of the feed gas 10 exiting the first reactor 40 (stream 3) as a warming medium to warm the feed gas 10 entering the first reactor 40. The portion of the feed gas 10 used as the warming medium is then returned (stream 5) to join the remainder of the feed gas 10 (stream 6) exiting the first reactor 40.

As shown in Table 2, the feed gas 10 enters the first reactor 40 (stream 2), at 500° F., with approximately 177.2 lbs. of hydrocarbons and a caloric value of 39.72 Btus/cubic foot of feed gas, and exits the first reactor 40 (stream 3) with approximately 121.93 lbs. of hydrocarbons and a caloric value of about 27.00 Btus/cubic foot of feed gas. Thus, approximately 29% by weight of the original hydrocarbons and about 32% of the caloric value are removed by the first catalytic combustion process. In this example, methane is not removed from the feed gas 10, but can be removed in a later processing operation in the carbon dioxide plant, such as in a stripper column where it is removed by distillation of the liquid carbon dioxide.

Following combustion in the first reactor 40, the feed gas 10 is successively fed to second and third reactors 80 and 120 (streams 7 and 13), respectively. More specifically, as shown in FIG. 1, the feed gas 10 receives oxygen (stream 18) from a second oxygen source 70 to provide an oxidant source for combustion in the second reactor 80. Prior to entry into the second reactor 80, the feed gas 10 is fed through a second heat exchanger 60 to raise the temperature of feed gas 10 (stream 10) to approximately 500° F. (stream 8). The feed gas 10 then enters the second reactor 80 and undergoes a second catalytic combustion process. The amount of oxygen injected into the feed gas 10 prior to entering the second reactor 80 is determined in accordance with the temperature of the feed gas 10 in the second reactor 80 as measured by a second thermometer 90. Approximately 42% of the hydrocarbons and 53% of the caloric value in the feed gas 10 entering the second reactor 80 are removed by the second combustion process in this example.

A portion (stream 10) of the feed gas 10 exiting the second reactor 80 (stream 9) is used as a warming medium in the second heat exchanger 60 to warm the feed gas 10 flowing into second reactor 80. The feed gas 10 used as the warming medium is then rejoined (stream 11) with the remainder of the feed gas 10 exiting the second reactor 80 (stream 12).

Subsequent to exiting the second reactor 80, the feed gas 10 is fed (stream 13) to a third heat exchanger 100 in which the feed gas 10 is cooled to approximately 530° F. The degree of cooling is determined in accordance with the temperature of the feed gas 10 in the third reactor as measured by a third thermometer 130. Of course, if necessary, heat may be added to the feed gas 10 in the third heat exchanger 100 to warm the feed gas 10 to approximately 530° F. The feed gas 10 then passes into a third reactor 120 (stream 14). The feed gas 10 undergoes a third catalytic combustion process during which about 62% of the entering hydrocarbons and about 46% of the caloric value are removed. The oxygen content of the feed gas 10 exiting the third reactor 120 (stream 15) is monitored by an oxygen sensor 135 and an excess concentration of about 500–1000 ppm(v) is maintained by a third oxygen source 110 (stream 19).

The feed gas 10 exits the third reactor 120 (stream 15) and passes through a fourth heat exchanger 136 to cool the feed gas 10 to approximately 115° F. The feed gas 10 is then fed (stream 16) to a carbon dioxide production facility (not shown).

The conventional multi-stage catalytic reactor system 5 discussed above and illustrated in FIG. 1 is effective for removing most hydrocarbons from a feed gas. For example, the catalytic reactor system discussed above removes about 84% of the hydrocarbons and about 84% of the caloric value present in an entering feed stream. However, such a system is relatively complicated and expensive to operate due to the relatively high caloric value of the feed stream.

A typical feed gas 10 from a chemical process may also include sulfur compounds in addition to the hydrocarbons previously discussed, and such sulfur compounds contaminate many conventional catalytic oxidation treatment facilities. The following U.S. patents illustrate technology used to remove volatile hydrocarbons from waste gas streams containing sulfur compounds.

U.S. Pat. No. 5,658,541 to Matros et al. describes a process and apparatus for removing volatile divalent sulfur compounds from waste gas streams. Volatile organic compounds are also converted to carbon dioxide and water vapor and are removed. Sulfur oxides resulting from a combustion process over a catalyst bed are removed by absorption or adsorption subsequent to the combustion process. The remaining waste gases, e.g., nitrogen, oxygen, carbon dioxide and water vapor, are vented to the atmosphere. During operation, sulfur salts build up on the catalyst bed and are periodically removed by raising the temperature of the catalyst bed to a reactivation temperature. The sulfur salts then decompose to form sulfur oxides and are purged from the catalyst bed. Further, Matros et al. provides for preheating the gas stream entering a combustion zone.

U.S. Pat. No. 5,061,464 to Cordonna et al. describes sulfur tolerant platinum group metal catalysts capable of oxidizing sulfur and carbon monoxide from a waste gas stream. U.S. Pat. No. 5,145,285 to Deeba et al. discloses a platinum on a titania or zirconia support. The disclosed catalyst may be used for the treatment of exhaust gases from vehicles and co-generation plants.

Although the Cordonna et al., Deeba et al. and Matros et al. patents provide processes for removing non-water soluble hydrocarbons from gas streams, these patents merely disclose catalytic oxidation systems producing waste gas streams which are vented to the atmosphere, and no attempt is made to remove the various compounds from the waste gas to provide a purified carbon dioxide product. In addition each of these systems described in these patents would require multistage catalytic reactors if the feed gas stream being treated has a high caloric value.

The prior art carbon dioxide systems discussed above generally do not provide an inexpensive and uncomplicated process and apparatus for removing hydrocarbons to low levels typical of stringent specifications for feeds that have a high caloric value. A need therefore exists for a more efficient carbon dioxide purification system for removing hydrocarbons from a feed gas with high caloric value. Such a system should preferably have the advantage of removing hydrocarbons inexpensively, and to a level permitted by, for example, stringent food grade specifications.

BRIEF SUMMARY OF THE INVENTION

One aspect of the present invention is a process for purifying a feed gas which comprises predominantly carbon dioxide and further comprises hydrocarbon contaminants, the process comprising the steps of:

(i) adsorbing hydrocarbons from said feed gas to an extent corresponding to a sufficient reduction of the caloric content of the feed gas that the product stream produced in this step can be catalytically oxidized in a single catalytic oxidation reactor, wherein preferably said product gas has a sufficiently high caloric value that said catalytic oxidation can proceed autogenously; and (ii) catalytically oxidizing hydrocarbons remaining in the gas stream produced in step (i).

Another aspect of the present invention is a carbon dioxide purification apparatus which includes (i) adsorption apparatus to adsorb hydrocarbons from a carbon dioxide feed gas onto an adsorbing material and produce a hydrocarbon-depleted gas stream, (ii) a catalytic oxidation reactor operatively connected to said adsorption apparatus to receive said hydrocarbon-depleted gas stream from said adsorption apparatus and oxidize residual hydrocarbons from said hydrocarbon-depleted gas stream, and (iii) apparatus for determining the caloric value of a hydrocarbon-depleted gas stream feed gas leaving said adsorption apparatus and diverting a portion of said gas stream around said adsorption apparatus as a function of said caloric value to provide that the gas stream produced in the adsorption apparatus can be catalytically oxidized in a single catalytic oxidation reactor, while providing in said gas a sufficiently high caloric value that said catalytic oxidation can proceed, preferably autogenously.

This invention will be particularly advantageous for carbon dioxide feed gases having a non-methane caloric value of greater than 12 Btus/standard cubic foot. This is due to the higher costs of the current option of a multistage catalytic oxidation system.

As used herein, "caloric value" is the heat ("heat of combustion") produced by the complete combustion with oxygen of all the material, capable of such combustion, that is present in a gas stream, divided by the total volume of the gas stream. Heats of combustion can be found in published references such as the Chemical Engineers Handbook.

DETAILED DESCRIPTION OF THE PREFERRED EMBODIMENTS

Figure 1:
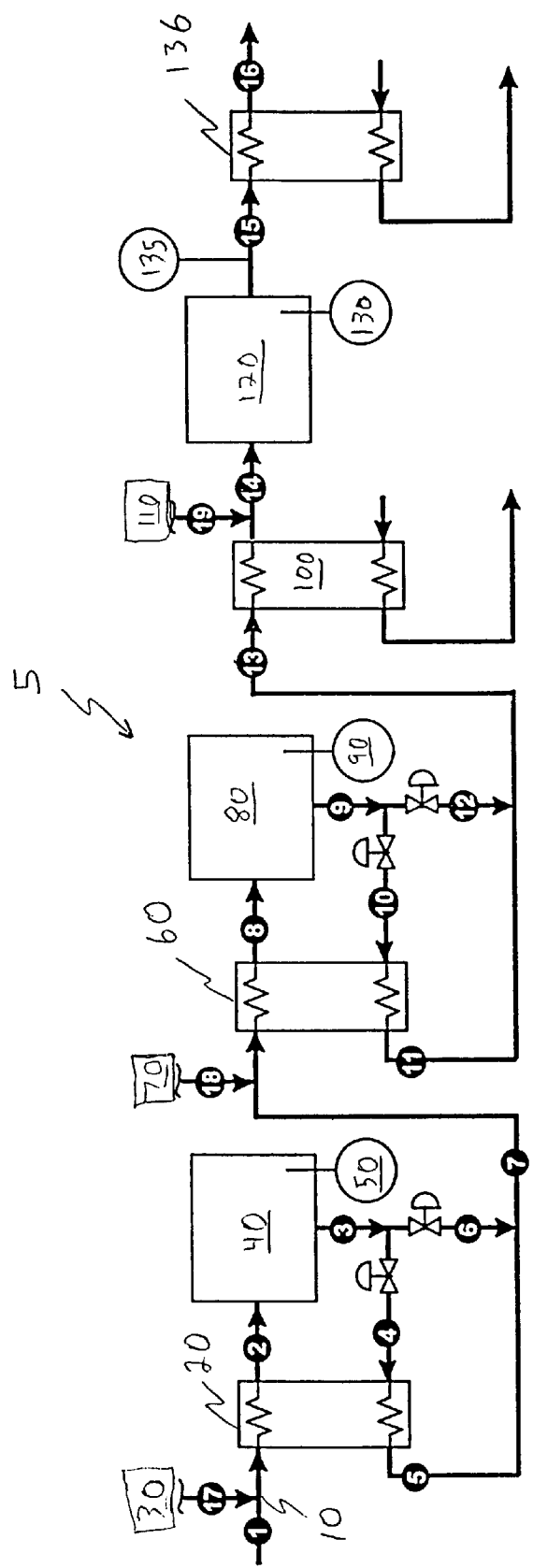
FIG. 1 illustrates a conventional carbon dioxide purification system.
Figure 2:
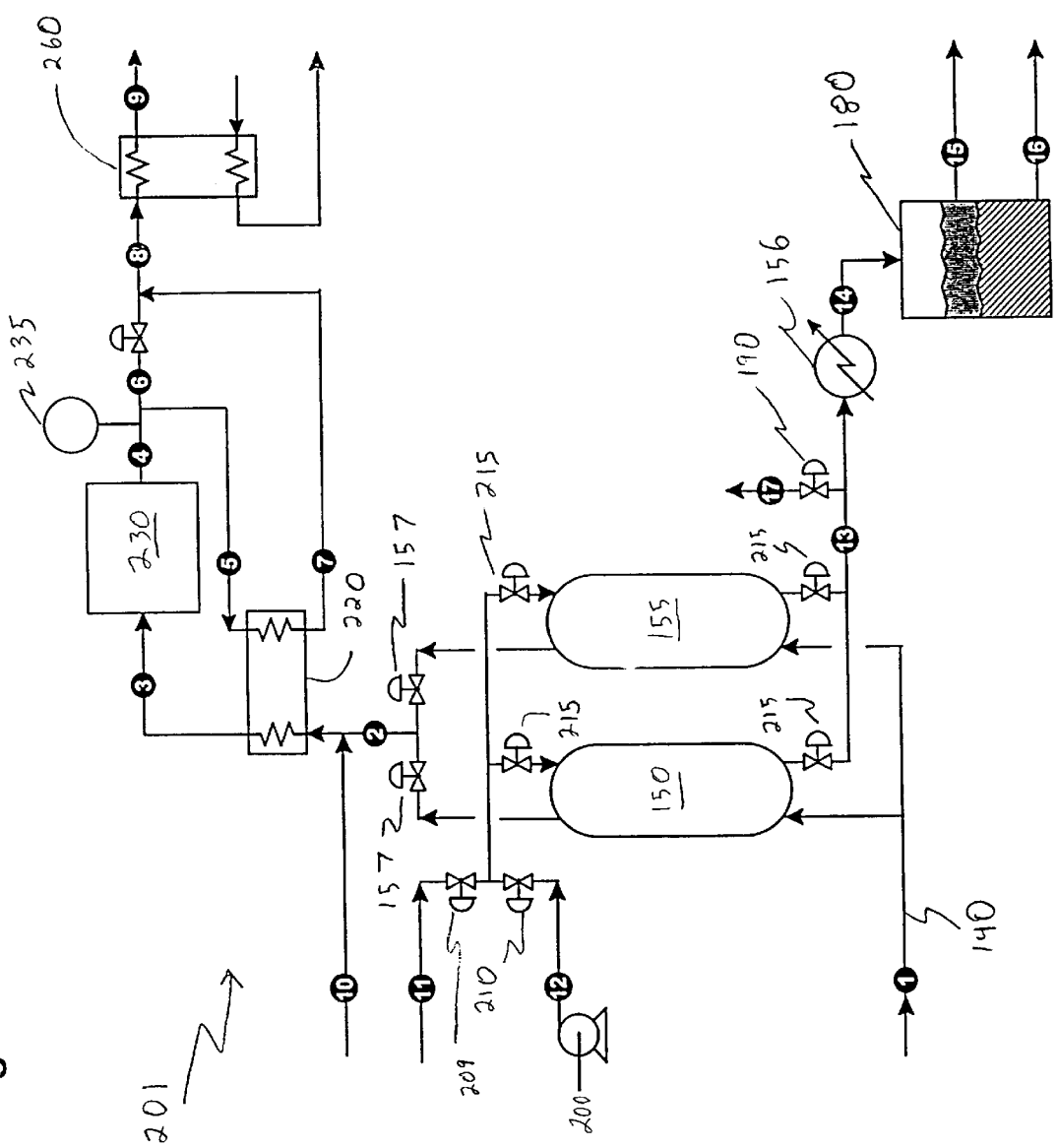
FIG. 2 illustrates a preferred embodiment of the present invention.

FIG. 2 is a block flow diagram of a preferred embodiment of a carbon dioxide purification system according to the present invention. Specifically, the present invention provides, among other aspects, a carbon dioxide purification system having an adsorption bed for removing high boiling point components located upstream of a single catalytic oxidation reactor. The single catalytic oxidation reactor then converts the remaining hydrocarbons to carbon dioxide and water. The present invention is explained below in detail.

As shown in FIG. 2, a feed gas (such as described in Table 1) 140 (stream 1) is introduced into the carbon dioxide purification system 201 from a known gas supply system (not shown). The feed gas 140 has an operating temperature of from 40° F. to 125° F., and more preferably from 50° F. to 100° F., and an operating pressure of from 200 psig to 350 psig, and more preferably from 275 psig to 325 psig. In addition to carbon dioxide, which is the predominant component present and generally constitutes at least 95 wt. %, preferably at least 98 wt. %, and more preferably at least 99 wt. % of the feed gas, the feed gas 140 provided by the gas supply system includes hydrocarbon components containing 4 or more carbon atoms, such as toluene, benzene, cyclohexane and hexane. Table 3 provides an example of typical physical characteristics as feed gas 140 is processed by the carbon dioxide purification system of the present invention.

TABLE 3

TYPICAL STREAM CHARACTERISTICS FOR FIG. 2

| Stream No. | Press. Psig | Temp. ° F. | Flow SCFH | Lbs./hr of Hydrocarbon | Caloric Value (Btus/Standard Cubic Foot) |
|---|---|---|---|---|---|
| 1 | 300 | 100 | 80,208 | 177.20 | 39.72 |
| 2 | 299 | 115 | 79,716 | 71.57 | 16.75 |
| 3 | 296 | 490 | 81,380 | 71.57 | 16.41 |
| 4 | 295 | 850 | 82,053 | 27.13 | 6.94 |
| 5 | 295 | 850 | 46,134 | 15.25 | 6.94 |
| 6 | 295 | 850 | 35,919 | 11.88 | 6.94 |
| 7 | 294 | 215 | 46,134 | 15.25 | 6.94 |
| 8 | 294 | 496 | 82,053 | 27.13 | 6.94 |
| 9 | 291 | 115 | 82,053 | 27.13 | 6.94 |
| 10 | 350 | 70 | 1,624 | 27.13 | 0 |
| 11 | 50 | 296 | 13,560 | 0 | 0 |
| 12 | 250 | 50 | 14,500[1] | 0 | 0 |
| 13 | 50 | 296 | 6,390 | 204 | NA |
| 14 | 0 | 85 | 38[2] | 204 | NA |
| 15 | 0 | 85 | NA | 105.6[3] | NA |
| 16 | 0 | 85 | 19[4] | 0 | NA |

[1]If air is used for cooling
[2]Flow is gph
[3]Flow is lbs./hr (Average)
[4]Flow is gph (Average)

As shown in FIG. 2, the feed gas (for example, feed gas described in Table 1) 140 is alternately directed into at least one of two adsorption beds 150 and 155 where the relatively heavy hydrocarbons such as toluene, benzene, cyclohexane and hexane are removed with an efficiency of approximately 92%. The feed gas 140 entering the adsorption beds 150 and 155 has approximately 150 pounds to 200 pounds of hydrocarbons caloric value of 34.0 to 45.0 Btus/cubic foot of feed gas. After passing through the adsorption beds 150 and 155, the feed gas 140 (stream 2) has approximately 50 pounds to 100 pounds of hydrocarbons or a caloric value of 11.5 to 23.0 Btus/cubic foot of feed gas and the remaining hydrocarbon concentration is about 200 to about 500 ppm.

Thus, the adsorption beds 150 and 155 remove hydrocarbons corresponding to approximately one third to three fourths of the total caloric content of the feed gas 140. Sufficient caloric content is removed that catalytic oxidation of the remaining hydrocarbons can be carried out in one reactor, but sufficient caloric content must remain in the gas stream that the catalytic oxidation can proceed autogenously, that is, without requiring input of auxiliary energy to the catalytic reactor to enable the catalytic oxidation to proceed.

When the feed gas 140 exits the adsorption beds 150 and 155, the feed gas 140 has an operating temperature of from 40° F. to 125° F., and more preferably from 50° F. to 100° F., and an operating pressure of from 200 psig to 350 psig, and more preferably from 275 psig to 325 psig.

The adsorption medium used in the adsorption beds 150 and 155 is preferably activated carbon. Alternatively, the adsorption medium may be, for example, a hydrophobic sieve in place of the activated carbon. Other adsorbents may be used depending on the contaminants in the feed.

In the preferred embodiment illustrated in FIG. 2, the adsorption beds 150 and 155 are coupled in a "two bed" arrangement such that one bed may perform the above-described adsorption process for removing hydrocarbons, and the other bed may perform a desorption process for regenerating the adsorption medium. Valves 157 may be manipulated to control which of the adsorption beds 150 and 155 performs adsorption. Of course, both of adsorption beds 150 and 155 may perform adsorption, or undergo the desorption process, simultaneously.

There are several ways to perform the desorption process such as, for example, by raising the bed temperature to approximately 300° F. with about fifty psig saturated steam (stream 11) supplied by a conventional steam supply. The time that the bed is heated is variable depending on the size of the beds, steam flow rate and amounts of hydrocarbons removed. Typical heating periods are 4 to 8 hours. Additionally, other heating fluids may be used to raise the temperature of the bed instead of steam. For example, carbon dioxide and nitrogen waste gas could also be used as a substitute for steam in the desorption process.

The steam enters the $CO_2$ purification system 201 by passing through a control valve 209 and is directed into one or both of adsorption beds 150 and 155 by selectively opening and closing valves 215. The steam then heats the adsorbing medium in the corresponding adsorption beds 150 and 155. Hydrocarbons adsorbed onto the adsorbent medium leave the carbon adsorption beds 150 and 155 during the desorption process in the form of hydrocarbon vapors (stream 13). The hydrocarbon vapors are then condensed in a heat exchanger 156. The condensed vapors (stream 14) are fed to a decanting tank 180 where the recovered hydrocarbons and water are separated. The recovered hydrocarbons (stream 15) can be further processed, used as a fuel or removed for disposal. If used as a fuel, the thermal energy from the recovered hydrocarbons is often more than sufficient to generate the steam required for the regeneration process. The water separated from the hydrocarbon vapors (stream 16) can be stored for future use or disposed of as waste water. A valve 190 is located between the adsorption beds 150 and 155 and the heat exchanger 156 for venting cooling gas (stream 17).

The heat exchanger 156 may be any conventional heat exchanger such as, for example, a plate-fin or shell-and-tube design. Of course, the heat exchanger 156 is not limited to such designs. Similarly, decanting tank 180 may be any conventional decanting arrangement.

Once the desorption process is completed, the flow of steam across the bed is stopped by closing valve 209. A valve 210 is then opened and a cooling stream of carbon dioxide, waste gas and/or air (stream 12) is passed across the bed to lower the temperature of the bed to approximately 40° F. to 125° F. The cooling stream is supplied by a conventional cooling stream supply 200 such as a fan or blower. After the desorption process, the bed is again ready for adsorption of hydrocarbons from the feed gas 140. The valves 210 and 215 are closed and a corresponding valve 157 is opened to permit the flow of feed gas 140 across the recently desorbed adsorption bed.

After the feed gas undergoes adsorption by one or both of the adsorption beds 150 and 155, the feed gas 140 exits the adsorption beds 150 and 155 and enters (stream 2) a first heat exchanger 220. In the first heat exchanger 220, the feed gas 140 is heated to approximately 400° F. to 550° F. and more preferably 450° F. to 500° F. at a pressure of 200 psig to 350 psig, and more preferably 275 psig to 325 psig. The first heat exchanger 220 may be any conventional heat exchanger such as, for example, a plate-fin or shell-and-tube design. Of course, the first heat exchanger 220 is not limited to such designs. A portion of the feed gas 140 (stream 5) leaving catalytic reactor 230, described below, is used as the thermal energy source in the heat exchanger 220 to heat the feed gas 140.

The heated feed gas 140 exiting the first heat exchanger 220 (stream 3) enters the catalytic reactor 230. To facilitate oxidation, an excess oxygen concentration is maintained in the feed gas 140 entering the catalytic reactor 230 by injecting oxygen (stream 10) into the feed gas 140 from an oxygen supply system (not shown) before the feed gas 140 enters the heat exchanger 220. Within catalytic reactor 230, the hydrocarbons contained in the feed gas 140 react with oxygen over a catalyst to form carbon dioxide and water. The feed gas 140 enters the catalytic reactor 230 (stream 3) with approximately 50 pounds to 100 pounds of hydrocarbons or a caloric value of 11.5 to 23.0 Btus/cubic foot of feed gas and, subsequent to combustion, exits the catalytic reactor 230 (stream 4) with approximately 20 pounds to 30 pounds of hydrocarbons.

The catalytic oxidation system is designed to intentionally allow the majority of the methane to pass through the reactor unreacted. This can be effected by carrying out the catalytic oxidation at a temperature high enough that ethane, propane and higher molecular weight hydrocarbons are oxidized there, without methane being oxidized, taking advantage of the fact that the oxidation temperature of methane is about 920° F. whereas that of ethane is about 810° F. and that of propane is about 770° F. Thus, approximately 40% to 80% of the hydrocarbons entering the catalytic reactor 230 are removed by combustion within the catalytic reactor 230.

The catalytic reactor 230 may be any conventional catalytic reactor and may use, for example, platinum or palladium metal as a catalyst, although any other suitable catalyst may be employed and the present invention should not be limited to the above-stated catalysts.

After exiting the catalytic reactor 230, the feed gas 140 is monitored by an oxygen monitor 235 to determine the oxygen concentration of the feed gas 140. At this stage, the feed gas 140 has an operating temperature of from 750° F. to 950° F., and more preferably from 800° F. to 900° F., and an operating pressure of from 200 psig to 350 psig, and more preferably from 275 psig to 325 psig. The oxygen monitor 235, and oxygen supply system may be any conventional oxygen monitoring and supply systems.

A portion of the feed gas 140 (stream 5) exiting the catalytic reactor 230 is diverted to the first heat exchanger 220. The diverted portion of the feed gas 140 then serves as a heat source in the first heat exchanger 220 to warm the feed gas 140 prior to the feed gas 140 entering the catalytic reactor 230. After exiting the first heat exchanger 220, the diverted portion of the feed gas 140 has an operating temperature of from 175° F. to 275° F., and more preferably from 200° F. to 250° F., and an operating pressure of from 200 psig to 350 psig, and more preferably from 275 psig to 325 psig. The diverted portion of the feed gas 140 is rejoined with the remainder of the feed gas 140 (stream 6) after passing through the first heat exchanger 220 (stream 7). Of course, other heat sources may also be used in the first heat exchanger 220 including, for example, steam or an electrical heater.

The above-described combination of the adsorption beds 150 and 155 and the catalytic reactor 230 removes approximately 80% to 100%, and more preferably 85% to 100% of the total hydrocarbons originally present in the feed gas 140. The amount of carbon dioxide in the product stream emerging from the catalytic reactor, compared to the carbon dioxide content of the feed gas, should correspond to carbon dioxide retention of at least 98%, preferably at least 99%, and more preferably at least 99.9%.

The composition of the gas stream leaving the catalytic reactor 230 is, for example, as shown in Table 4.

TABLE 4

TYPICAL $CO_2$ GAS COMPOSITION
exiting the catalytic oxidation system (Hydrocarbons)

| | PPM(V) |
|---|---|
| Total non-methane hydrocarbons (as methane) | <20 |
| Unsaturated hydrocarbons | <5 |
| Benzene | <0.021 |
| Ethanol | <10 |
| Methanol | <10 |
| Acetaldehyde | <0.2 |
| Other volatile oxygenates | <1 |
| $CO_2$ purity (excluding non-condensibles) | 99.90% |

After the portion of the feed gas 140 serving as a heating medium in heat exchanger 220 is rejoined with the remaining portion of the feed gas 140, the feed gas 140 flows to a carbon dioxide liquefaction system 260 (stream 8). The carbon dioxide liquefaction system 260 liquifies the carbon dioxide in the feed gas 140, removes the non-condensibles such as oxygen, nitrogen 5 and methane by distillation and stores the liquid carbon dioxide (stream 9) for future use. At this stage, the liquid carbon dioxide has an operating temperature of from −20° F. to 10° F., and more preferably from −10° F. to 0° F., and an operating pressure of from 200 psig to 350 psig, and more preferably from 250 psig to 300 psig. The carbon dioxide liquefaction system 260 may be any conventional liquefaction system using, for example, a heat exchanger using conventional cooling fluids for cooling the gas stream. The composition of the liquid at this point is, for example, as shown in Table 5.

TABLE 5

| Impurities | Concentration ppm(v) |
|---|---|
| Total hydrocarbons (as methane) | <30 |
| Unsaturated Hydrocarbons | <5 |
| Oxygen | <30 |
| Nitrogen | <60 |
| Hydrogen | <30 |
| Other inerts: He, Ar | <30 |
| Carbon monoxide | <10 |
| Total sulfur (as $H_2S$) | <0.1 |
| Ethanol | <10 |

TABLE 5-continued

| Impurities | Concentration ppm(v) |
|---|---|
| Methanol | <10 |
| Acetaldehyde | <0.2 |
| Benzene | <0.021 |
| Other volatile oxygenates | <1 |
| Water | <20 |
| $CO_2$ Purity (assay) | 99.90% |

Figure 3:
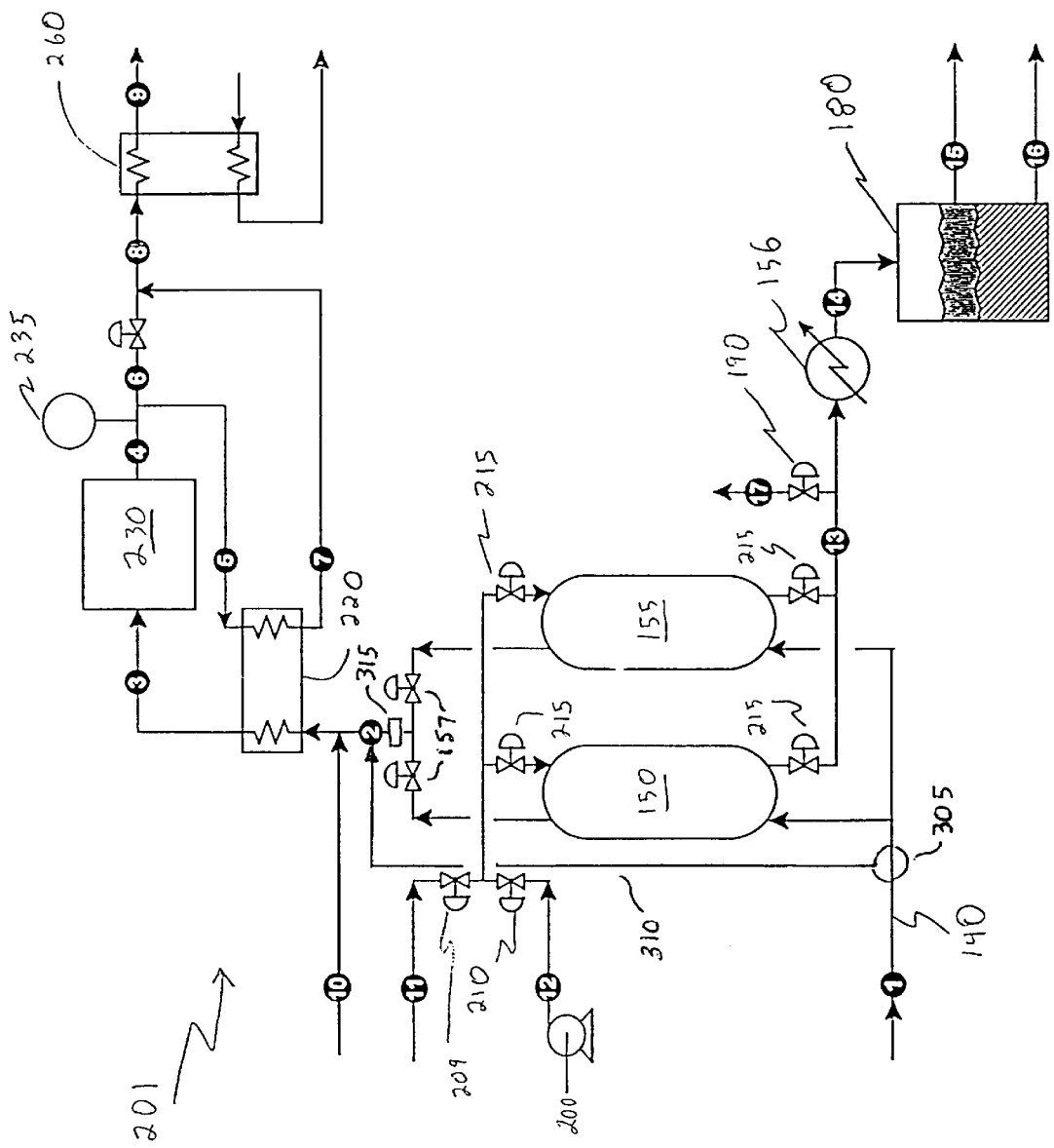
FIG. 3 illustrates an optional but preferred variant of the embodiment shown in FIG. 2.

The preferred embodiment of the present invention provides many features and advantages over the prior art. For example, the carbon dioxide adsorption beds 150 and 155 remove a large percentage of the relatively heavy hydrocarbons from the feed gas 140 before the feed gas 140 enters the catalytic reactor 230. The catalytic reactor 230, therefore, may operate at a relatively low temperature and multiple combustion stages are not necessary. Consequently, as illustrated in FIGS. 2 and 3, the preferred embodiment of the present invention requires only a single catalytic reactor 230 for catalytic combustion. Thus, the present invention provides a less expensive and more efficient carbon dioxide purification system than does the prior art.

FIG. 3, in which all elements identical to those in FIG. 2 have the same reference numerals in FIGS. 2 and 3, depicts a variant of the embodiment of FIG. 2. In this variant, stream 140 is passed into a valve 305 which has two outlets, one of which is connected to the continuation of line 140 leading into the adsorbers 150 and 155, and the other of which is connected to line 310 which feeds into line 2 downstream of (and thus bypassing) adsorbers 150 and 155. Valve 305 can be set so that none, all, or any percentage between 0 and 100% of the gas stream entering valve 305 can be fed to the adsorbers, with the balance being fed to line 310 bypassing the adsorbers.

Sensor 315 is positioned downstream of the adsorbers, before the point at which line 310 rejoins the stream. Sensor 315 continuously measures the caloric value of combustible components in the stream leaving the adsorbers. This measurement can be effected by analysis of all, or a sample portion, of the stream, by any of the techniques currently familiar to those working in this field. In response to the caloric value of this stream as measured by sensor 315, the position of valve 310 is set so as to provide that the caloric value of the gas stream being fed to catalytic reactor 230 is constant, for instance at 18 Btus per standard cubic foot, or a constant value less than that. The adjustment of the position of valve 310 can be made manually, based on reading out the measurement made by sensor 315, but is preferably made automatically by means in which sensor 315 generates an electrical signal corresponding to the measured caloric value, which signal is conveyed via an electric line (not shown) from sensor 315 to an electronic controller which in turn controls a motor that sets or adjusts the position of valve 310 in response to that signal. The valve would divert a relatively higher portion of the gas stream around the adsorbers when the hydrocarbon concentration in the incoming stream 140 is relatively low, or at the beginning of an adsorption cycle when the adsorbent is relatively "clean" and thus has a relatively high capacity so that the system is removing a relatively higher percentage of the hydrocarbons present.

Of course, the present invention need not be limited to the specific embodiment discussed above and shown in FIGS. 2 and 3. For example, in an alternative embodiment within the scope of the present invention, the catalytic reactor 230 can be operated at temperatures up to approximately 1100° F. in order to additionally remove methane from the feed gas 140. Further, the adsorption beds 150 and 155 may be operated to additionally remove sulfur. Alternatively, the sulfur compounds may be converted to sulfur dioxide in the catalytic reactor 230 and removed in an adsorber bed located downstream of the carbon dioxide purification system.

While the present invention has been described with respect to what it is considered to be the preferred embodiment, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the various components shown in outline or in block form in FIGS. 2 and 3 are individually well known and their internal constructions and operation are not critical either to the making or using of this invention or to a description of the best mode of the invention.

What is claimed is:

1. A process for purifying a feed gas which comprises at least 95 wt. % carbon dioxide and further comprises hydrocarbon contaminants, the process comprising the steps of:

(i) adsorbing hydrocarbons from said feed gas to an extent corresponding to a sufficient reduction of the caloric content of the feed gas that the gas stream produced in this step can be catalytically oxidized in a single catalytic oxidation reactor; and (ii) catalytically oxidizing hydrocarbons remaining in the gas stream produced in step (i).

2. A process as recited in claim 1 wherein said adsorbing step reduces the caloric value of the feed gas to less than 18 BTU per standard cubic foot.

3. A process as recited in claim 1 wherein said adsorbing step reduces the caloric value of the feed gas to less than 12 BTU per standard cubic foot.

4. A process as recited in claim 1, wherein the non-methane hydrocarbon concentration in the feed gas is reduced to less than 20 ppm(v) (expressed as methane) by the catalytic oxidation step.

5. A process as recited in claim 1, wherein said adsorbing step and said catalytic oxidation step together remove approximately 80% to 100% of the hydrocarbons from the feed gas.

6. A process as recited in claim 1 wherein hydrocarbons remaining in the gas stream produced in step (i) are catalytically oxidized in only one catalytic reaction.

7. A process as recited in claim 1 wherein said gas stream produced in step (i) has a sufficiently high caloric value that said catalytic oxidation can proceed autogenously.

8. A process as recited in claim 1, further comprising continuously measuring the caloric value of said gas stream produced in step (i) and in response to said measured caloric value adjusting the percentage of said feed gas from which hydrocarbons are adsorbed so that the caloric value of the gas stream fed to said catalytic oxidation step (ii) is constant.

* * * * *